United States Patent
Alupului et al.

(10) Patent No.: US 9,946,968 B2
(45) Date of Patent: *Apr. 17, 2018

(54) QUESTION-ANSWERING SYSTEM

(71) Applicant: International Business Machines Corporation, Armonk, NY (US)

(72) Inventors: Mariana Alupului, Durham, NC (US); Andrea L. Ames, Redwood City, CA (US); Beth Anne M. Collopy, Amesbury, MA (US); Joseph F. Pesot, Cary, NC (US); Robert Pierce, Alfred, ME (US); David C. Steinmetz, Bothell, WA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/229,361

(22) Filed: Aug. 5, 2016

(65) Prior Publication Data
US 2017/0213124 A1  Jul. 27, 2017

Related U.S. Application Data

(63) Continuation of application No. 15/002,713, filed on Jan. 21, 2016, now Pat. No. 9,471,668.

(51) Int. Cl.
*G06F 17/30* (2006.01)
*G06N 3/00* (2006.01)
*G06N 99/00* (2010.01)

(52) U.S. Cl.
CPC ....... *G06N 3/006* (2013.01); *G06F 17/30684* (2013.01); *G06N 99/005* (2013.01)

(58) Field of Classification Search
CPC ........ G06F 17/30654; G06F 17/30684; G06F 17/30345; G06F 17/30557; G06F 17/2705; G06F 17/30; G06F 17/30867; G06F 17/30274; G06F 17/30386; G06F 17/3064; G06F 17/30598; G06F 17/28; G06F 17/3053; G06F 17/30696; G06F 17/3097; G06F 17/30976; G06Q 30/0601;
(Continued)

(56) References Cited

U.S. PATENT DOCUMENTS

2003/0086116 A1* 5/2003 Hall .................. G06K 17/0032
358/1.15
2005/0086045 A1* 4/2005 Murata ............. G06F 17/30654
704/2

(Continued)

OTHER PUBLICATIONS

List of IBM Patents or Patent Applications Treated as Related; (Appendix P), Date Filed Aug. 5, 2016 2 pages.

(Continued)

*Primary Examiner* — Anh Ly
(74) *Attorney, Agent, or Firm* — Cantor Colburn LLP; Richard Wilhelm

(57) ABSTRACT

A computer program product and method provides a question and answer service that accepts an initial first question from a user and analyzes the question by a first generation subsystem to generate a first answer. A second generation subsystem of the question and answer service is configured to generate a second question based at least in-part on keywords from the first question and the first answer.

10 Claims, 3 Drawing Sheets

(58) Field of Classification Search
CPC .... G06Q 30/0625; G06N 5/04; G06N 99/005; G06N 3/006; H04L 65/403
See application file for complete search history.

(56) References Cited

U.S. PATENT DOCUMENTS

| | | | |
|---|---|---|---|
| 2005/0282135 A1* | 12/2005 | Berman | G09B 7/00 434/323 |
| 2008/0294637 A1* | 11/2008 | Liu | G06F 17/30861 707/E17.107 |
| 2009/0012926 A1* | 1/2009 | Ishikawa | G06F 17/30654 707/E17.068 |
| 2009/0112828 A1* | 4/2009 | Rozenblatt | G06F 17/30672 707/E17.014 |
| 2010/0191686 A1* | 7/2010 | Wang | G06F 17/30634 707/E17.108 |
| 2011/0045452 A1* | 2/2011 | Bejar | G09B 7/04 434/362 |
| 2011/0065082 A1* | 3/2011 | Gal | G09B 7/02 434/365 |
| 2011/0258192 A1* | 10/2011 | Yao | G06F 17/30637 707/737 |
| 2012/0041950 A1* | 2/2012 | Koll | G09B 7/02 707/728 |
| 2012/0095977 A1* | 4/2012 | Levin | G06Q 30/02 707/706 |
| 2012/0301864 A1* | 11/2012 | Bagchi | G09B 7/02 434/362 |
| 2012/0331391 A1* | 12/2012 | Kanjirathinkal | G06Q 50/01 715/738 |
| 2013/0034840 A1* | 2/2013 | Burton | G06Q 30/0201 434/362 |
| 2013/0132308 A1* | 5/2013 | Boss | G06F 17/30976 706/12 |
| 2013/0246046 A1* | 9/2013 | Fan | G06F 17/2785 704/9 |
| 2013/0288219 A1* | 10/2013 | Dheap | G09B 7/12 434/350 |
| 2014/0272885 A1* | 9/2014 | Allen | G09B 7/00 434/322 |
| 2014/0272904 A1* | 9/2014 | Bagchi | G09B 7/02 434/362 |
| 2015/0032473 A1* | 1/2015 | Sadrieh | G06F 17/30823 705/3 |
| 2015/0186537 A1* | 7/2015 | Liu | G06F 17/30867 707/722 |
| 2015/0363090 A1* | 12/2015 | Sarangdhar | G06F 3/0481 715/762 |
| 2016/0196334 A1* | 7/2016 | Bastide | G06F 17/30539 707/776 |
| 2016/0292204 A1* | 10/2016 | Klemm | G06F 17/30368 707/E17.108 |
| 2017/0039502 A1* | 2/2017 | Guman | G06Q 50/22 707/E17.068 |

OTHER PUBLICATIONS

U.S. Appl. No. 15/002,713, filed Jan. 21, 2016; Entitled: Question-Answering System.

\* cited by examiner

QUESTION-ANSWERING SYSTEM

DOMESTIC PRIORITY

This application is a continuation of U.S. application Ser. No. 15/002,713, now U.S. Pat. No. 9,471,668, filed Jan. 21, 2016, the contents of which in its entirety are herein incorporated by reference.

BACKGROUND

The present disclosure relates to a data processing question-answering (QA) system and method, and more particularly, to a subsystem of the QA system that facilitates computer-generated follow-up questions based on the initial user question and a computer-generated answer to the user question.

With the increased usage of computing networks, such as the Internet, humans are currently inundated with the amount of information available from various structured and unstructured sources. However, information gaps are prevalent as users try to piece together relevant information that they can find during the information searches on various subjects. To facilitate such information searches, recent research is directed to generating question-answering (QA) systems that may take a user inputted question, analyze it, and return results indicative of the most probable answer or answers to the input question. QA systems provide automated mechanisms for searching through large sets of sources of data (e.g., electronic documents) and analyze the data with regard to the input question to process/determine one or more answers to the user question.

One such QA system is the Watson™ system that is available from the International Business Machines (IBM) Corporation of Armonk, N.Y. The Watson™ system is an application of advanced natural language processing, information retrieval, knowledge representation and reasoning, and machine learning technologies to the field of open domain question answering. The Watson™ system is built on IBM's DeepQA technology used for hypothesis generation, massive evidence gathering, analysis, and scoring. DeepQA analyzes a user question, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and abased on trained models, performs a final merging and ranking to output an answer to the input question.

SUMMARY

In accordance with an embodiment, a computer implemented method of operating a question-answering system includes inputting a first question into a user interface by a user. The first question may then be analyzed by a computer device utilizing a corpus of data and outputting a computer generated candidate second question or questions based at least in-part on the first question. By providing a semantically similar question, the present disclosure may assist users to explore an unfamiliar domain and/or ask question with less time and effort than that required for more traditional systems.

A computer program product according to another embodiment provides a question-answering service. The service is facilitated by a first generation subsystem of the computer program product that is configured to receive a first question from a user and computer and to generate at least one first answer to the question. A second generation subsystem is configured to generate a second candidate question based at least in-part on keywords from the first question and the content of the first answer or answers.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Question-answering (QA) systems, such as the Watson™ system and others, provide answers to user input questions by ingesting a large corpus of documentary data, annotating the data, and generally processing the data before-hand to generate structured information from structured and unstructured electronic documents. With a QA system, a user inputted question is received, the QA system parses the question and analyzes the question to determine what is being asked for, and then performs a search of its ingested data from the corpus to identify candidate answers for the user inputted question, determine confidence scores for the candidate answers based on analysis of evidentiary information, and the like. With confidence scores determined, the QA system may then present the answer(s) associated with the highest confidence. More specific to the present disclosure, the QA system may include a computer-generated question subsystem that computes second generation question(s) based on the user-inputted question and the computer-generated answer to the user-inputted question. The computer-generated question(s) may be presented to the user and, upon a user selection of the computer-generated question, that question may be provided as the second-generation question that the QA system uses to compute a second-generation answer.

Figure 1:
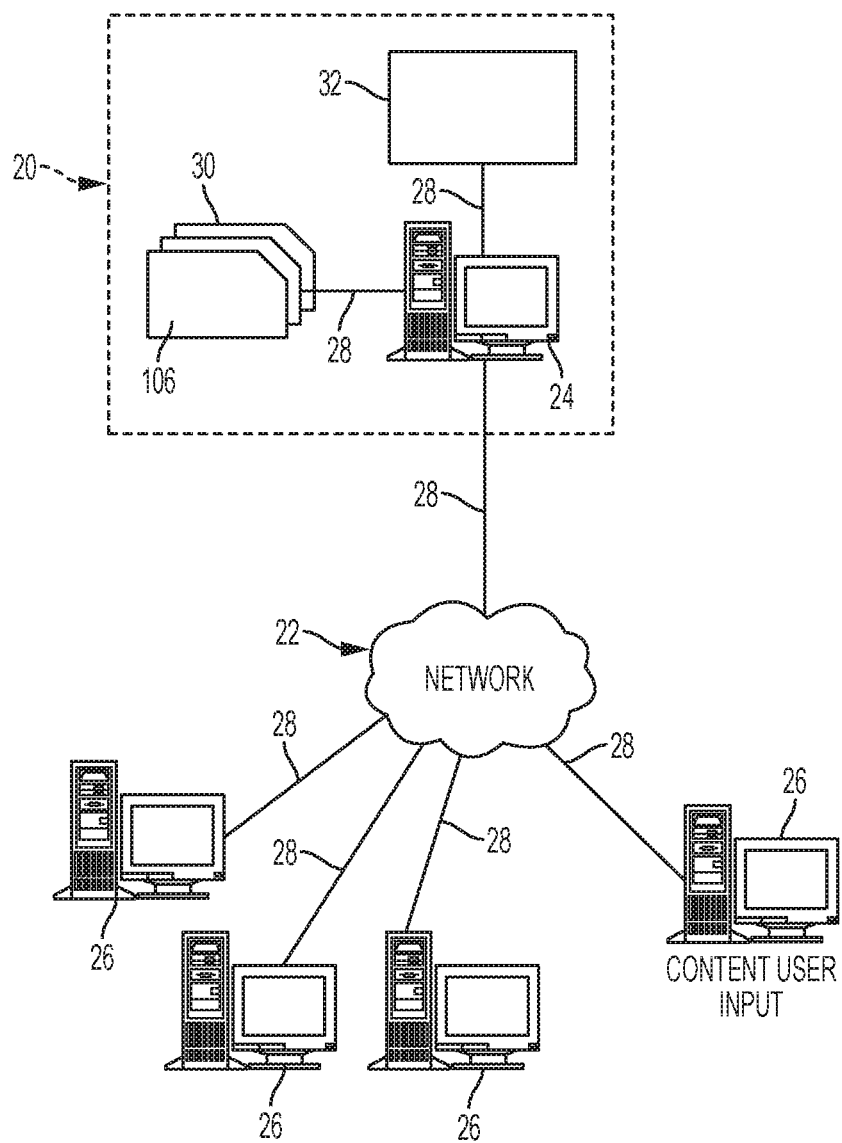
FIG. 1 depicts a schematic diagram of one embodiment of a question-answering system in a computer network.

Referring to FIG. 1, a schematic diagram of one, non-limiting, embodiment of a QA system 20 of the present disclosure in a computer network 22 is illustrated. The QA system 20 may include a computing device 24 connected to the computer network 22. The network 22 may include multiple computer devices 26 in communication with each other and with other devices or components via one or more wired and/or wireless data communication links 28. The computer devices 24, 26 may each include at least one processor, at least one memory, and any other computing device elements generally known in the art including buses, storage devices, communication interfaces and others. Each communication link 28 may include at least one of wires, routers, switches, transmitters, receivers and others. The QA system 20 and network 22 may enable one or more content users. Other embodiments of the QA system 20 may be used with components, systems, subsystems, and/or devices other than those herein depicted.

The QA system 20 may be configured to receive inputs from various sources including the network 22, a corpus of electronic documents 30 (i.e., corpus of data), and a variety of other data sources 32 (e.g., content creator). In one embodiment, some or all of the inputs to the QA system 20 may be routed through the network 22. The various computing devices 26 on the network 22 may include access points for content creators and/or content users. In one embodiment, the content creator 32 creates content in the document 30 for use as part of a corpus of data with the QA system 20. The document 30 may include any file, text, article, or source of data for use in the QA system 20. Some of the computing devices 24, 26 may include devices for a database storing the corpus of data. The network 22 may include local network connections and remote connections in various embodiments, such that the QA system 20 may operate in environments of any size, including local and global (e.g., the Internet).

QA components operate by accessing information from the corpus of electronic documents 30, analyzing it, and then generating answer results based on the analysis of this data. Accessing information from the corpus of electronic documents 30 typically includes: a database query that answers inquiries about what is in a collection of structured records, and a search that delivers a collection of document links in response to a query against a collection of unstructured data (e.g., text, markup language, etc.). Conventional QA systems are capable of generating answers based on the corpus of data and the input question, verifying answers to a collection of inquiries for the corpus of data, correcting errors in digital text using a corpus of data, and selecting answers to user questions from a pool of potential answers (i.e., candidate answers).

Figure 2:
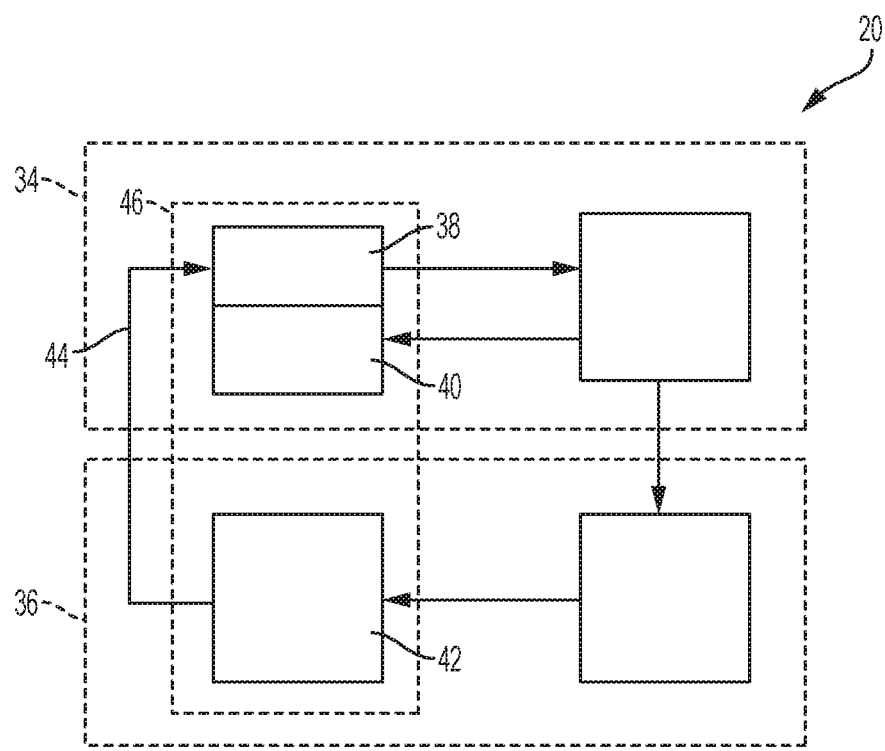
FIG. 2 depicts a schematic diagram of the question-answering system.

Referring to FIGS. 1 and 2, content users may access the QA system 20 via the network connection or an Internet connection to the network 22. The QA system 20 may generally be divided into an initial or first generation subsystem or component 34 and a succeeding or second generation subsystem or component 36. The first generation subsystem 34 is generally configured to accept a user generated first question 38 and output a computer generated first answer 40. The second generation subsystem 36 is configured to analyze the first question 38 and the associated first answer 40 and output a computer generated succeeding or second question 42. In one example, the user may choose or select the second question 42 upon which the QA system 34 reverts (see arrow 44) to the first generation subsystem 34 to generate an answer.

A user interface 46 of the QA system 20 may generally be part of or shared by the first and second generation subsystems 34, 36, and may further include a web browser. More specifically, the user interface 46 may be used by a user (i.e., human) for entering the initial question 38 that is analyzed by the first generation subsystem 34. The first generation subsystem 34 then outputs the answer 40 which may be displayed on the user interface 46. Generally at the same time, the second generation subsystem 36 analyzes the user initiated first question 38 and the associated answer 40 and outputs the second question 42 that may be displayed on the user interface 46 for selection by the user. It is contemplated and understood that the second generation subsystem may generate and display a plurality of second (i.e., follow-up) questions for user selection.

Users may access the first generation subsystem 34 of the QA system 20 via any one of a plurality of user interfaces 46 via the network connections 28 (e.g., Internet connection) to the network 22, and may input questions 38 to the first generation subsystem 34 that may be answered by the content in the corpus of data (e.g. documents 30, content creator input 32, etc.). In one embodiment, the initial questions may be formed using natural language. The first generation subsystem 34 may interpret the question and provide a response to the content user containing one or more answers 40 to the question 38. In some embodiments, the first generation subsystem may provide a response to the user(s) in a ranked list of answers 40.

One example of the first generation subsystem 34 may generally be the Watson™ system available from International Business Machines Corporation of Armonk, N.Y., which is augmented with the mechanisms of the illustrative embodiments described herein. The Watson system 34 may receive an input question 38 which it then parses to extract the major features of the question. The major features are then used to formulate queries that are applied to the corpus of data. Based on the application of the queries to the corpus of data, a set of hypotheses, or candidate answers to the input question are generated by looking across the corpus of data for portions of the corpus of data that have some potential for containing a valuable response to the input question 38.

The Watson system 34 then performs a deep analysis on the language of the input question 38 and the language used in each of the portions of the corpus of data found during the application of the queries using a variety of reasoning algorithms. There may be hundreds or even thousands of reason algorithms applied, each of which performs different analysis (e.g., comparisons), and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the Watson system 34. The statistical model may then be used to summarize a level of confidence that the Watson system 34 has regarding the evidence that the potential response (i.e., candidate answer) is inferred by the question 38. This process may be repeated for each of the candidate answers until the Watson system 34 identifies candidate answers that surface as being significantly stronger than others and thus, generates a final answer, or ranked set of answers 40 for the input question 38. More information about the Watson system may be obtained, for example, from the IBM Corporation website, IBM Redbooks, and other sources. For example, information about the Watson system may be found in Yuan et al., "Watson and Healthcare," IBM developer Works, 2011, and "The Era of Cognitive Systems: An Inside Look at IBM Watson and How it Works," by Rob High, IBM Redbooks, 2012.

Figure 3:
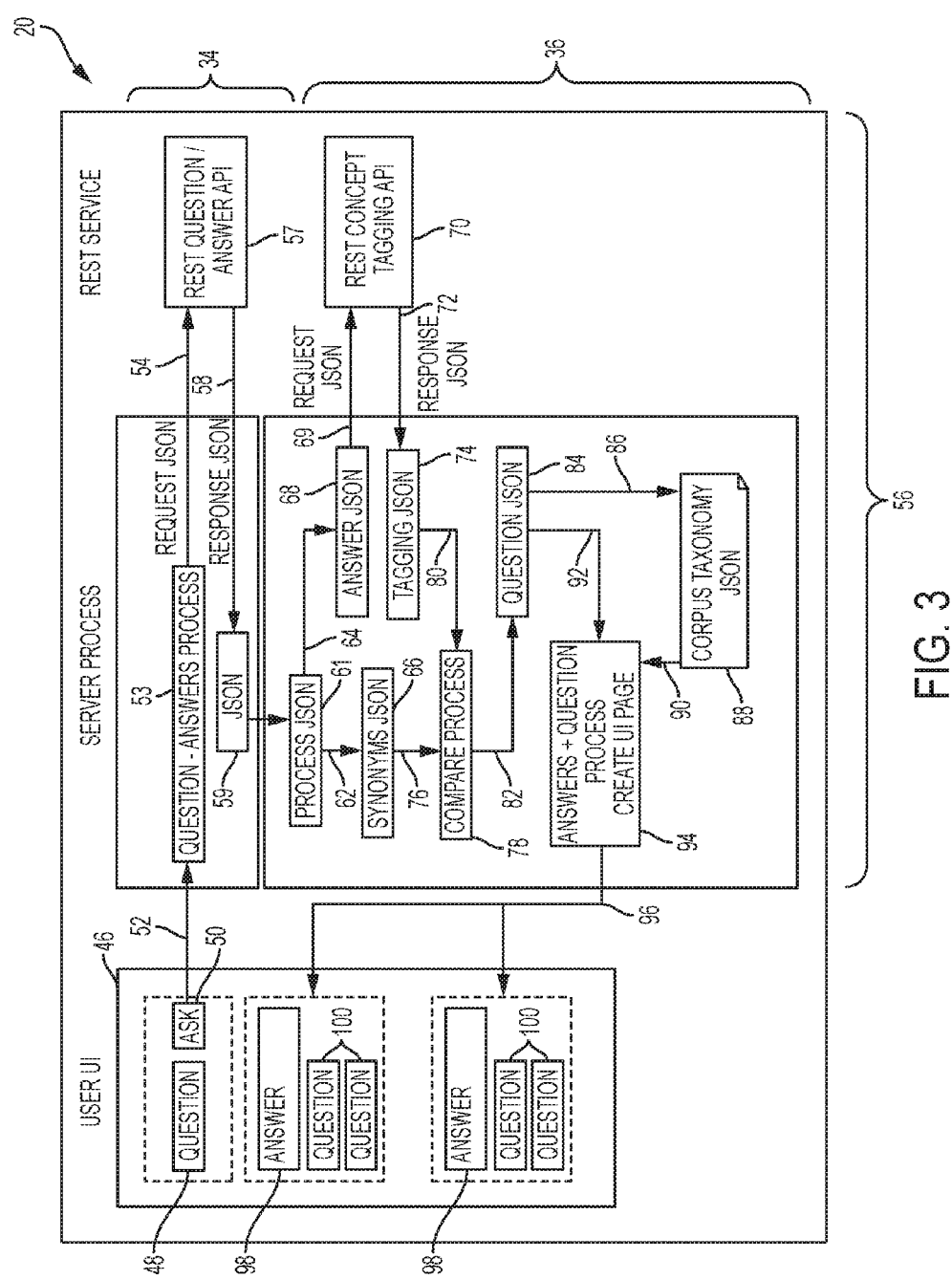
FIG. 3 depicts a flowchart diagram of a method of operating the question-answering system.

Referring to FIG. 3, a first generation question is entered or posted by a user into a form 48 displayed on the user interface 46 and the user may then select (or enter) an ask selection 50. The question is then outputted (see arrow 52) to a block 53 of, for example, a computer-based processor and/or a server application 56 (e.g., remote server) that may transform the request/question into a JavaScript Object Notation (JSON) value or other similar values of a lightweight data-interchange format that may be based on the object-literal notation, for example, JavaScript. JSON may be programming-language neutral but may use conventions from various languages. The JSON value may be analyzed by the same server application 56 or sent to another remote server (e.g., cloud) as a request (see arrow 54). The first generation subsystem 34 (e.g., Watson QA system, see FIG. 2) may be configured to, or may be a portion of, the first generation subsystem 34.

The first generation subsystem 34 may be configured to perform entity extraction and keyword extraction (with IBM Alchemy API as an example) toward the generation of a first generation answer to the first generation question. In the present embodiment, the term entities generally specifies things such as persons, places, organizations, and others. An Entity Extraction API may be capable of identifying people, companies, organizations, cities, geographic features and other types of entities from HTML, text, or web-based content. An Entity Extraction API facilitates the addition of semantic knowledge to the content to assist in a relatively quick understanding of the subject of the text (i.e., first generation question). Entity extraction may generally be a starting point for using natural language processing techniques to enrich content, and may be based on statistical algorithms and natural language processing technology.

Keywords (i.e., relative to a Keyword Extraction API) are the important topics in the content and may be used to index data, generate tag clouds, or for searching. A Keyword Extraction API service may be capable of finding keywords in test and ranking them. The sentiment may then be determined for each extracted keyword. A Keyword Extraction API service may work on URLs, HTML documents and plain text. Like other features, the IBM Alchemy API service may automatically detect the language of the content and may then perform the appropriate analysis. A Keyword Extraction API may employ algorithms and natural language processing technology to analyze content and identify the relevant keywords. Keyword extraction may be supported in many foreign languages enabling foreign language content to be categorized and tagged also.

The first generation question or JSON value is in a Representational State Transfer (REST API) or other similar software architectural styles for distributed hypermedia systems (e.g., World Wide Web) when acted upon by the first generation subsystem 34 of the server application. REST API may often be used to describe any simple interface that uses XML (or YAML, JSON, and plain text) over HTTP without an additional messaging layer such as SOAP. Via the IBM Alchemy REST API processing (i.e., Entity and Keyword Extraction) the JSON value is analyzed by the first generation subsystem 34 associated with the server application 56 (e.g., cloud). A block 57 (i.e., REST Question/Answer API) of the first generation system 34 outputs a response (see arrow 58) in what may be a JSON format and representative of the first generation answer that contains a set of synonyms relating to keywords of the first generation question.

The Response 58 is received by a block 59 (JSON format) of the first generation subsystem 34, where the response is sent to a block 61 of the second generation subsystem 36. At block 61 the Response 58 and its JSON format (59) is processed, thereby separating a set of synonyms (see arrow 62) from a first generation answer (see arrow 64). The set of synonyms 62 are received by a block 66, and the first generation answer 64 is received by a block 68. Block 68 then sends the first generation answer 64 as a Request JSON (also see arrow 69) to block 70 representative of a concept-tagging API service of the second generation subsystem 36. The concept-tagging API service employs text analysis techniques to concept tag documents in a manner similar to how humans would identify concepts. The concept-tagging API (i.e., block 70) is capable of making high-level abstractions by understanding how concepts relate, and can identify concepts that are not necessarily directly referenced in the text. For example, if an article mentions CERN and Higgs Boson, it may tag Large Hadron Collider as a concept even if the term is not mentioned explicitly in the page. By using concept tagging, higher levels of analysis may be performed on the content when compared to basic keyword identification.

Block 70 may then output a Response JSON (see arrow 72) representative of assigned tags and concepts relative to the first generation answer, and a set of related keywords based on those concepts, to block 74. The set of synonyms from block 66 are sent (see arrow 76) to block 78. Also, the set of related keywords from block 74 are sent (see arrow 80) to block 78. Block 78 is representative of a comparison process where the keywords 80 relative to the concepts (i.e., tagging JSON), the set of synonyms 76 (i.e., synonyms JSON), and literal keywords from the first generation question are compared.

More specifically, the keywords 80 derived from the concept-tagging API service (i.e., block 70) may be viewed as a keywords list. Block 78 (i.e., a compare process API) is a service that removes any matching synonym words from the keywords list, and removes any matching literal keywords (i.e., words taken directly from the first generation question) from the keywords list. After such a comparison and removal of redundant terms, a resulting keywords list (see arrow 82) is sent to a block 84 of the second generation subsystem 36 as a JSON value. Block 84 provides validated candidate keywords in JSON format for consideration for construction of followup questions.

The keywords in JSON format (block 84) are fed by way of arrow 86 to block 88, a Corpus Taxonomy JSON API service. This service takes the keyword list as input and merges the keywords with templated questions. Block 88 then sends the resulting candidate questions (see arrow 90) back to block 84. From block 84 (see arrow 92) the first-generation answer and second-generation questions are sent to block 94, where the content is tagged for display in a UI. The results are provided (see arrow 96) to respective display fields 98, 100.

Although not illustrated, once the second generation question(s) are displayed on the user interface 46, the user may select a second generation question that may, in-turn, be sent to block 53 of the first generation subsystem 34 for similar processing as that performed for the first generation question.

In one example, a user may enter: "What are the benefits of taking aspirin daily?" into form 48 of the user interface 46. The first generation subsystem 34 may then establish the following:

Entities: "aspirin"
    Type: Drug
    Literal Keywords: "benefits"
    Synonyms: "good, sake, welfare, well-being, advantage, comfort, ease, convenience"
    First Generation Answer: "A blood clot can: Block blood flow to your heart and cause a heart attack. Prevent blood from getting to your brain and cause a stroke. Taking daily aspirin can prevent blood clots and lower your risk of heart attack or stroke. If you've already had a heart attack or stroke, daily aspirin can lower your risk of having another one."

The term "entity" is the keyword or generally the subject matter of the first generation question. The term "type" is the entity type. The term "literal keywords" are those keywords found directly in the first generation question. The term "synonyms" is the synonym set established by block 57.

The second generation subsystem 36 may utilize the same entity and type designations and establish the following:
- Literal Keywords: "heart attack, daily aspirin, blood clot, stroke, blood flow, risk, brain"
- Concepts Text: "Myocardial infarction, Thrombosis, Hematology, Warfarin, Atrial fibrillation, Embolism"
- Compare Text (exclude): "aspirin"

The method compares the question keyword (e.g., aspirin) and excludes these keywords from the second generation question(s) which removes the possibility of having the same question asked again. The compare process of block 78 is realized between the Alchemy API keywords (entities text/type/concept values) and the initial question keywords and synonyms.

The second generation questions may be based on type with concepts following a prescribed template provided by block 88. For example:
Concepts:
What is _XXX_ caused by?
What factor causes _XXX_?
What is _XXX_?

Where "XXX" is replaced with the keywords for the related concepts (Concepts text in paragraph 32).

For example:
What is myocardial infraction caused by?
What factor causes myocardial infraction?
What factor causes thrombosis?
What is hematology?
What is atrial fibrillation cause by?
What factor causes embolism?

Advantages and benefits of the present disclosure include a question-answering system capable of 'coaching' users that are unfamiliar with a field of study encompassed by a corpus of data, by suggesting concepts and associated questions to explore, even if mentors or a community is not available. Other advantages include a system that builds on synonyms and concept-tagging to enhance question-answering systems by improving interaction with users through the expansion of initial questions. Moreover, the QA system may leverage the cognitive computing abilities of more traditional QA systems.

The present disclosure may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method of operating a question-answering system comprising:
    receiving a first question input into a user interface by a user;
    analyzing the first question by a computer device utilizing a corpus of data to determine a computer generated first answer to the first question;
    extracting a set one or more keywords from the first answer and the first question;
    removing at least one keyword from the set of one or more keywords to create a subset of one or more keywords, wherein the removing the at least one keyword is based at least in-part on a comparison of the at least one keyword to the first question; and
    outputting a computer generated second question based at least in-part on the first question, wherein the second question is based in-part on the subset of one or more keywords from the first answer and the first question.

2. The method set forth in claim 1 further comprising:
receiving a selection of the second question from the user.

3. The method set forth in claim 2 further comprising:
analyzing the second question by the computer device; and
outputting a computer generated second answer to the second question.

4. The method set forth in claim 3, wherein the second question is one of a plurality of second question available for selection by the user.

5. The method set forth in claim 3, wherein the first answer is generated by a first generation subsystem of the question and answer system.

6. The method set forth in claim 5, wherein the second question is generated by a second generation subsystem of the question-answering system.

7. The method set forth in claim 6, wherein the second answer is generated by the first generation subsystem.

8. The method set forth in claim 1, wherein the second question is semantically similar to the first question.

9. The method set forth in claim 1, further comprising:
utilizing a taxonomy template by the computer device for, at least in-part, generating the second question.

10. The method set forth in claim 9, wherein the taxonomy template is based on a subject of the corpus of data.

* * * * *